Patented Mar. 23, 1948

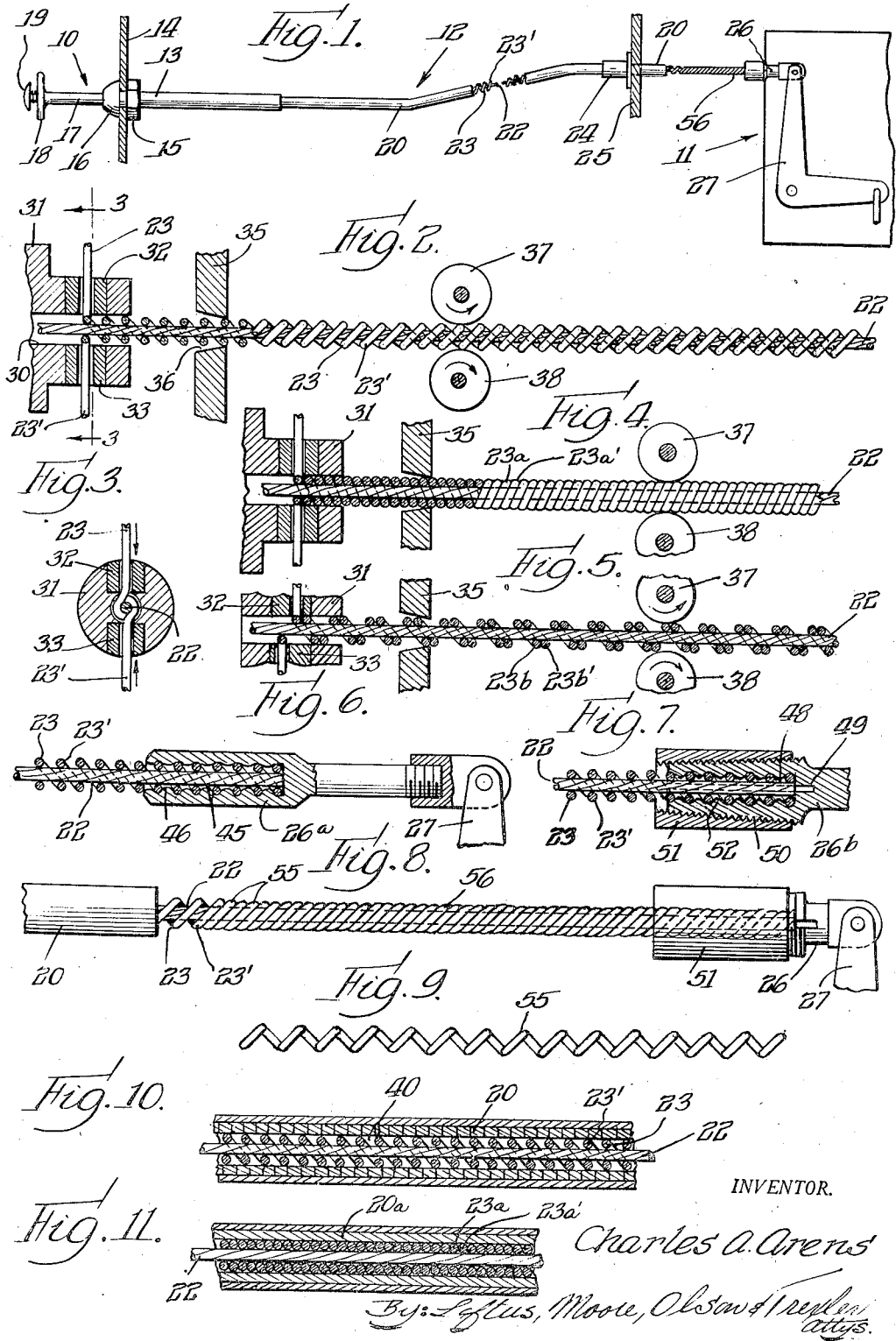

2,438,380

UNITED STATES PATENT OFFICE 2,438,380

TRANSMISSION CABLE

Charles A. Arens, Chicago, Ill., assignor to Arens Controls, Inc., Chicago, Ill., a corporation of Illinois Application May 31, 1944, Serial No. 538,170

1 Claim. (Cl. 74—501)

This invention relates to cable constructions, and particularly to transmission cable structures of the type adapted to transmit mechanical motions and forces between predetermined operating stations.

It is an object of the invention to provide a transmission cable structure of improved construction, and particularly to provide a transmission cable of the type having a composite or multiple part inner shiftable within an outer housing sheath, which can be more readily fabricated and which has improved operating characteristics in service.

More specifically stated, it is an object of the invention to provide a transmission cable of the type defined which is more positive in operation, wherein there is a minimum of sponginess or looseness in the structure, and wherein the size and fit of the cooperative parts may be more accurately controlled.

Further objects of the invention are to provide a transmission cable of the type stated which is smooth in operation, having a minimum of weight and friction, wherein lubrication of the parts is facilitated, and wherein the lateral flexibility of bendability of the structure may be readily controlled as desired.

A still further object of the invention is to provide a transmission cable structure wherein the attachment of fittings, such as end fittings or the like, is facilitated.

Another object of the invention is to provide an improved transmission cable of the type provided with a composite inner shiftable structure, wherein the central core member of the inner is adapted to receive and transmit stresses both of tension and of compression.

Various other objects, advantages and features of the invention will be apparent from the following specification when taken in connection with the accompanying drawings, wherein certain preferred embodiments are set forth for purposes of illustration.

In the drawings, wherein like reference numerals refer to like parts throughout:

Fig. 1 is a general assembly view of a control installation incorporating a transmission cable structure constructed in accordance with and embodying the principles of the invention;

Fig. 2 is a longitudinal view on an enlarged scale, and somewhat diagrammatic in form, illustrating the means and methods for fabricating the composite inner shiftable portion of the transmission cable structure;

Fig. 3 is a transverse sectional view of the structure of Fig. 2, on the line 3—3 thereof;

Figs. 4 and 5 are views, generally similar to Fig. 2, but illustrating modified embodiments;

Figs. 6 and 7 are views illustrating the manner of attaching various types of end fittings to the cable;

Fig. 8 is a view illustrating means for reinforcing the cable end to increase the lateral rigidity thereof;

Fig. 9 is a detail view of the reinforcing member illustrated in Fig. 8; and,

Figs. 10 and 11 are illustrative views showing two embodiments of the shiftable cable inner, arranged for shiftable movement within an outer sheath or housing structure.

Referring more specifically to the drawings, in Fig. 1 there is set forth for illustrative purposes a control installation such, for example, as adapted to embody the transmission cable structure of the invention. As shown, this control installation comprises an operating control structure, generally indicated by the numeral 10, and an operated mechanism generally indicated by the numeral 11, operatively connected by means of a flexible transmission cable 12. More specifically, the control structure 10 comprises a frame sleeve 13 suitably mounted upon a dashboard or other support panel 14, by means of a pair of clamp nuts 15 and 16. An operating sleeve 17 having a manual handle 18 is adapted for longitudinal shiftable movement within the frame sleeve 13, a locking button 19 being provided for releasing the operating sleeve for actuation. A manual control structure of the foregoing type is more specifically described in my prior United States Letters Patent No. 2,161,661, dated June 6, 1939, and entitled "Holding or locking device."

The flexible transmission cable 12 comprises an outer housing or sheath portion 20 rigidly secured at one end to the housing sleeve 13, and a composite shiftable inner transmission portion connected at one end to the operating member 17. In accordance with the present invention this composite inner transmission cable portion comprises a central core wire 22 and an encompassing wire coil 23, 23' and will hereinafter be more specifically described. The core 22 and coil 23, 23' are rigidly secured together and are shiftable as a unit within the flexible sheath 20.

The cable sheath 20 at its end remote from the control structure 10, is anchored to a frame bracket 24 mounted upon a suitable support panel 25; whereas the composite shiftable inner cable assembly is connected to an end fitting 26 arranged to effect the operation of a pivoted bellcrank lever 27 forming a part of the mechanism to be controlled.

As the operating member 17 is shifted in one direction or the other, under actuation of the manual control handle 18, it will be seen that corresponding increments of movement will be imparted to the bell-crank 27 of the operated device, the operating and operated mechanisms being operatively connected by the shiftable transmission cable elements shiftable as a unit within the cable sheath 20.

The transmission cable of the present invention is adapted to various uses and types of installations, and accordingly it is to be understood that the control installation above described, and shown in Fig. 1, is illustrative only, and shows one suitable control installation with which the transmission cable of the invention may be used.

In Fig. 2 means and methods are illustrated for forming the composite shiftable inner portion of the transmission cable structure. In accordance with the invention, the wire coil 23, 23' is wound directly upon the core wire 22, in tightly embracing relation therewith. By this means the core wire 22 and the coil 23, 23' in effect comprise an integral structure, shiftable as a unit within their outer sheath, as above set forth. As illustrated in Fig. 2, the inner may be formed by longitudinally transmitting the core wire 22 through the central bore 30 of a rotating head 31. The head carries a pair of diametrically disposed feed bushings 32 and 33 having radial passages communicating with the central head bore 30, and through which a pair of wires 23 and 23' may be transmitted from a suitable source of supply. It will be seen that as the core wire 22 is transmitted longitudinally through the rotating head, the coil wires 23 and 23' will be wound upon the core in tightly embracing relation therewith, and in double pitch relation. A stationary die member 35, having a central opening 36 of predetermined size, may be provided for accurately controlling the external diameter of the wire coil. As the coil is formed it is transmitted through the die, and thus accurately gauged as to size.

A pair of feeding rollers 37 and 38, powered from a suitable power source, may be provided for controlling the longitudinal feeding rate of the structure as it is formed. These rollers are adapted to cooperatively grip the coil and control its longitudinal feeding rate. As shown in Fig. 2, the longitudinal feeding rate may be so controlled that the wires 23 and 23' are wound upon the core wire 22 in open pitch relationship. While the coil wires therefore grip the core only at predetermined spaced points, these spaced points are sufficiently close together so that the core wire 22, which may for example be a simple stranded wire having its individual strands disposed at a pitch greater than that of the coil wires 23 and 23', is enabled to absorb stresses both of tension and compression. In other words, the core wire 22 itself absorbs and resists both tension and compression, in the operation of the structure, the wire coil 23, 23' being employed merely to enable the central core wire to perform these functions. The coil wires 23 and 23' embrace the central core wire 22 at sufficiently closely spaced points so as to prevent bending of the core wire under compression, or separation of the core wire cable strands.

The arrangement of the coil wires 23, 23' in open pitch relationship reduces the weight of the structure, as compared with an arrangement wherein the coil wire convolutions are in abutting or substantially abutting relationship. Also, the structure can be bent in sharper arcs of curvature. As will be perhaps best understood by reference to Fig. 10, wherein the composite cable inner is shown in assembled position within its sheath 20, pockets or spaces 40 are provided between the coil wires 23 and 23', when they are in open pitch relationship. These pockets may be filled with lubricant to facilitate lubrication of the structure, and also form pockets for the reception of any dirt or other foreign matter which may find its way into the structure, whereby to minimize jamming of the movable cable portions, due to the presence of dirt or the like. The open pitch arrangement also reduces the contact areas between the coil wires 23, 23' and the sheath 20, thus minimizing friction; and the relatively long lead of the wires 23, 23', as compared with the pitch of the sheath coil, promotes smooth sliding movement of the cable inner within the housing sheath. As shown in Fig. 10, the sheath 20 comprises a helical wire coil, whereby to provide a flexible sheath structure. While this wire coil provides a substantially smooth inner bore, some irregularities are necessarily presented along which the coil wires 23, 23' must slide in the operation of the parts.

The coil 23, 23' and the core 22 being in effect an integral structure, there is no sponginess or yield in the structure as it is subjected to tension and compression. More particularly, contacting convolutions in the coil are not relied upon to resist forces of compression. Accordingly there is no crawling or overlapping of the coil convolutions onto each other under cable compression, resulting in variation or sponginess in axial length, as well as variation in external coil diameter. On the contrary the coil convolutions remain permanently fixed, eliminating axial sponginess, as above stated, and also fixing the external coil diameter so that a close and proper sliding fit with the sheath coil 20 may be provided. This close fit, thus permitted, further precludes axial sponginess in the structure when the cable is subjected to compressive stresses.

Obviously the coil which embraces the core wire may be composed of a single wire, a pair of wires 23 and 23' as illustrated in Fig. 2, or any other suitable number as may be desired, depending upon the construction of the winding head.

By varying the pitch or spacing of the coil wires, the lateral rigidity or flexibility of the structure may be controlled, this being possible due to the fact that the coil convolutions are not required to be in abutting relationship, for the reasons above described. In Fig. 4, however, an embodiment is illustrated wherein the coil convolutions 23a and 23a' are in substantially abutting relation, as may in a particular instance be desired to provide increased lateral rigidity or resistance to bending in the structure. This close spacing of the coil convolutions may be effected merely by eliminating the feeding action of the rollers 37 and 38, permitting the structure to eject itself longitudinally from the winding head, or by appropriately reducing the feeding speed of the rollers 37 and 38, as may be desired. The structure of Fig. 4 is illustrated within its sheath in Fig. 11. In this instance the sheath 20a is illustrated as being of non-flexible construction, it being clear that a flexible or a non-flexible sheath or housing may be employed, as desired.

In Fig. 5 an embodiment is illustrated wherein the coil wires 23b and 23b' are so disposed that they are in open pitch pairs, as may in certain instances be desired. This spacing may be effected by the operation of the feed rollers 37 and 38, as in the structure of Fig. 2, coupled with an offsetting of the radial passages in the head bushings 32 and 33, as illustrated.

The methods and apparatus illustrated in Figs. 2, 3, 4 and 5 are more particularly shown in my copending application, Serial No. 542,581, filed June 28, 1944, and entitled Method and apparatus for making transmission cables.

In Figs. 6 and 7 means and methods are illustrated for attaching fittings, such as end fittings or the like to the cable structure. In Fig. 6 it will be seen that the fitting 26a has a recess 45 for receiving the core wire 22 and the coil wires 23 and 23', the fitting being swedged and/or soldered directly onto the coil wires whereby to permanently fix the fitting on the cable end. When the cable is cut or otherwise formed to length, there is no tendency for the core wire 22 and the coil wires 23, 23' to separate, or for the core wire to be drawn into an inaccessible position within the coil. On the contrary, the core and coil wires remain at all times in proper position, thus facilitating the application of fittings or the like thereto, such as the fitting 26a. In swedging the fitting onto the coil wires, lugs or lands 46 will be formed between the wires, thus affording a firm anchorage for the structure.

In Fig. 7 an alternate type of fitting is shown applied to the cable end. In this instance the fitting 26b is provided with a recess 48, as in the case of the fitting 26a, and is additionally provided with a longitudinal slit 49, and with a threaded tapered outer surface 50 upon which a threaded tapered sleeve 51 is adapted to be screwed. It will be seen that as the sleeve 51 is threaded onto the tapered surface 50, the fitting 26b will be clamped firmly upon the cable end, the slit 49 being compressed as the fitting is brought into gripping engagement. Due to the helical arrangement of the coil wires 23 and 23', the fitting recess may be provided, if desired, with co-mating screw threads 52, and the fitting screwed onto the cable end in bringing the cable into the fitting recess.

In Figs. 8 and 9 the structure is illustrated for reinforcing the cable end, to impart increased lateral rigidity to that portion of the cable which projects from the end of the sheath 20. More particularly, one or more wire coils as shown at 55, Fig. 9, may be screw threaded, as a nut, into engagement with the helical coil convolutions of the coil wires 23 and 23', thus providing at the end of the cable a portion 56 of increased lateral rigidity, and of increased resistance to compressive forces. The coils 55 may be of relatively stiff wire whereby to insure maximum rigidity in the structure, if desired. The fitting 26 may be secured onto the end of the cable, as in the case of the fitting 26b previously described, except that the screw threads, such as the screw thread 52, will be shaped to accommodate the wire coils 55. In the case of a double pitch double wire coil, such as the wires 23 and 23', two reinforcing wire coils 55 also in double pitch arrangement will be used. If the wire coil embracing the core wire 22 were a single wire single pitch coil, a single wire reinforcing member 55 would be used.

It is obvious that various changes may be made in the specific embodiments set forth without departing from the spirit of the invention. The invention is accordingly not to be limited to the specific embodiments shown and described, but only as indicated in the following claim.

The invention is hereby claimed as follows:

In a transmission cable construction, a composite inner cable structure adapted for movement as a unit within an outer sheath, said inner cable structure comprising a core wire, a first wire coil embracing the core wire and forming a structural unit therewith, the convolutions of the wire coil being in spaced relation, but being sufficiently closely spaced so as to enable the core wire to resist stresses of compression without lateral buckling, and a second helically formed wire coil, the convolutions of said second wire coil also being in spaced relation and being of the same pitch as the convolutions of the first named wire coil, said second wire coil being materially shorter than the first wire coil and the two wire coils being arranged in interthreaded engagement substantially along the length of the second wire coil.

CHARLES A. ARENS.

REFERENCES CITED

The following references are of record in the file of this patent:

UNITED STATES PATENTS

| Number | Name | Date |
|---|---|---|
| Re. 13,884 | Herzmark | Feb. 23, 1915 |
| 1,918,792 | Arens | July 18, 1933 |
| 2,067,815 | Barber | Jan. 12, 1937 |
| 2,195,400 | Arens | Apr. 2, 1940 |
| 2,211,790 | Pile | Aug. 20, 1940 |

FOREIGN PATENTS

| Number | Country | Date |
|---|---|---|
| 215,469 | Switzerland | Sept. 16, 1941 |
| 398,596 | Great Britain | Sept. 21, 1933 |
| 437,194 | Great Britain | Oct. 21, 1935 |
| 548,934 | Great Britain | Oct. 29, 1942 |